United States Patent
Erukulla

[11] Patent Number: 5,891,524
[45] Date of Patent: *Apr. 6, 1999

[54] OVERSPRAY RECYCLING PROCESS

[75] Inventor: Anjaneyulu Erukulla, Lyndhurst, Ohio

[73] Assignee: American Standard Inc., Piscataway, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 452,602

[22] Filed: May 25, 1995

[51] Int. Cl.$^6$ ................ B05D 1/02; B05D 1/12
[52] U.S. Cl. ............ 427/345; 427/180; 427/193; 427/376.2; 427/427
[58] Field of Search .................... 427/180, 193, 427/345, 421, 427, 376.2; 118/312, 326; 106/286.8

[56] References Cited

U.S. PATENT DOCUMENTS

| | | |
|---|---|---|
| 3,201,272 | 8/1965 | Forshee ................................ 118/326 |
| 4,044,175 | 8/1977 | Coxon et al. . |
| 4,354,451 | 10/1982 | Vöhringer et al. . |
| 4,376,136 | 3/1983 | Gernez ................................ 427/345 |
| 4,601,918 | 7/1986 | Zaman et al. ......................... 118/234 |
| 4,607,592 | 8/1986 | Richter . |
| 4,926,924 | 5/1990 | Brooks et al. ......................... 118/312 |
| 4,980,030 | 12/1990 | Johnson et al. . |
| 5,107,756 | 4/1992 | Diaz ....................................... 118/326 |
| 5,173,325 | 12/1992 | Knobbe et al. ........................ 118/312 |
| 5,292,547 | 3/1994 | Schlumpf et al. . |
| 5,512,100 | 4/1996 | Ingram et al. ......................... 118/326 |

*Primary Examiner*—Shrive Beck
*Assistant Examiner*—David Maiorana
*Attorney, Agent, or Firm*—Joseph M. Homa

[57] ABSTRACT

A method for collecting ground coat and cover coat overspray material generated during the enameling of sanitary ware. The collected overspray material is blended with a fine powder, water is added to the overspray-powder blend to form a slurry, the rheology is adjusted and the resulting slurry is ready for application to the sanitary ware.

29 Claims, No Drawings

OVERSPRAY RECYCLING PROCESS

BACKGROUND OF THE INVENTION

The present invention is directed to a process for recovering overspray material resulting from the porcelain enameling process of sanitary ware, and more particularly to a recycling process which reuses the collected material in the ground coat enameling operation of sanitary ware.

The porcelain enameling process of sanitary ware such as water closets, sinks, tubs and the like, generally includes a spray coating operation followed by a firing operation. A typical enameling process includes a ground coat application, a drying cycle, a firing cycle, and a cover coat application followed by another drying and firing cycle. During the ground coat and cover coat applications, only a portion of the finely sprayed powder is deposited on the ware. The portion not reaching the ware is called overspray. Depending on the form of the target object and the type of spray coating system, the overspray share of the total consumption of enamel material amounts to about 25 to about 30%.

The collection of overspray material takes place simultaneously with the enameling process. The overspray material is typically collected in dust collection units and includes both ground coat and cover coat material in random ratios. This resulting overspray material is not functional as usable material in the enameling operation because of the undesired mixture of ground coat and cover coat material. Moreover, it is not practical or advantageous to collect the overspray material separately from the dust collection units after each ground coat spray operation and cover coat spray operation. This would be time consuming and very expensive. Therefore, since the overspray material is not usable in its collected state, it must be disposed of or sent back to the enamel supplier. Both of these options include transport and disposal costs which are very expensive. Unfortunately, the disposal of overspray material places a heavy burden on the environment.

The prior art shows several systems for the collection and recycling of overspray paint in an electrostatic painting environment. A number of these systems provide a conduit for returning unused paint powder to the paint supply hopper. Others treat the collected paint with various materials to alter the characteristics of the collected overspray paint. U.S. Pat. Nos. to Coxon et al. (4,044,175) and Vöhringer et al. (4,354,451) both teach systems whereby dry overspray paint is collected in a hopper and recycled back into a dry paint supply hopper. The recycled paint may be recycled to the top coat sprayer if only one color is used, or alternatively may be fed back to the undercoat sprayer if nonhomogeneous paint is collected. The paint remains dry throughout the process and is not modified with any additives.

U.S. Pat. Nos. to Richter (4,607,592), Johnson et al. (4,980,030), and Schlumpf et al. (5,292,547), each teach systems whereby the overspray paint is collected from the painting system through the use of water in the spray chamber. This slurry of excess paint and water is then treated with a variety of chemicals to improve the characteristics of the paint. This process includes the addition of chemicals, mixing of the slurry, and concentration of the solution by removing water from the slurry. All of these systems which add chemicals to control the characteristics of the overspray paint collect the paint with water. Therefore, the chemicals are being added to an aqueous solution. All are organic chemical based systems used in paints. None of the prior art processes teach the addition of dry powder to dry collected overspray dust. None of the prior art processes teach a recycling process involving the enameling of sanitary ware.

It is desirable to reduce costs involved in the handling of overspray material collected from the enameling operation of sanitary ware. It is preferable to obviate disposal of the overspray material altogether. It is desirable to utilize inorganic materials as the basic components of a recycling process. It is important to provide a process for recycling the collected overspray material from the enameling operation that is cost-effective and beneficial to the sanitary ware manufacturer.

SUMMARY OF THE INVENTION

It is therefore an object of the invention to collect and recycle overspray material which results from the enameling of sanitary ware.

It is another object of the invention to reuse ground coat and cover coat overspray material as ground coat enamel for sanitary ware.

It is a related object of the invention to reduce or eliminate land disposal costs and pollution associated with overspray material from the enameling of sanitary ware.

These and other objects and advantages are achieved by the present invention which provides a process for collecting ground coat and cover coat overspray material generated during the enameling of sanitary ware. The collected overspray material is blended with a fine powder, water is added to the overspray-powder blend to form a slurry, the rheology is adjusted and the resulting slurry is ready for application to the sanitary ware.

DETAILED DESCRIPTION OF THE INVENTION

The present invention relates to a process for producing a ground coat composition from the collected overspray material generated during the enameling of sanitary ware. The ground coat enamel composition may be applied to any articles which are conventionally coated with an enamel layer. Such articles include, but are not limited to, sinks, tubs, water closets, urinals and the like.

Typically, all porcelain enamels are produced as frits by smelting operations in which dry ingredients containing the oxide constituents are mixed together and heated in a furnace at temperatures from about 1800° to about 2400° F. to melt the batch components. After the smelting operation, molten frit is discharged into a body of water or passed through water cooled rolls to solidify the frit. The frit is then treated to form a slip or slurry by grinding (ball milling) in water or another suspension vehicle to a finely ground state. Mill additions such as suspending agents, electrolytes, refractories, coloring oxides, and bisque strengtheners are then added to the frit compositions to adjust the rheology. Preparation of the slurry provides a suspension of the finely divided frit and mill additives in water or other liquid vehicles to a consistency such that the material may be applied to ferrous metal by spraying, dipping or flow coating in a conventional manner. The coating is applied to a thickness, for example, from approximately 4 to approximately 20 mils on a dry basis, uniformly covering the entire surface.

To coat ferrous metals, such as iron or cold rolled steel, it is important that the metal be carefully cleaned before the enamel is applied. The pretreatment process involves the immersion of the metal in an alkaline cleaner or suitable equivalent to remove grease and dirt. The metal is then rinsed with hot water and given a pickling treatment, for example, in a 7% to 9% solution of sulphuric acid heated to a temperature of about 150° to about 160° F. The pickled metal is then rinsed with water and placed in a solution of nickel sulphate for the purposes of depositing a thin film of nickel of not less than 0.02 or greater than 0.12 gram per square foot on the surface of the metal. This is referred to as nickel flashing. The nickel-flashed steel is rinsed again with water to complete the cleaning operation and then neutralized to remove acid and dried. Sand blasting is another technique which may be employed to prepare the surface of the metal for enameling. Once the metal has been treated, the slurry is applied to the metal and is heated to a temperature ranging from about 1450° to about 1650° F.

Enamels typically comprise a two-component system, a ground coat and a cover coat. The essential property of the ground coat is that it must adhere to the steel base. Typical ground coat formulations contain refractory oxides such as silica or alumina in the form of feldspar, fluxing agents such as boron or fluorine in the form of fluorspar or cryolite, adhesion oxides such as cobalt or nickel oxide, and sometimes iron oxide to accelerate the reaction at the ferrous-enamel interface. Additionally, as noted above, pretreatment of the surface to be enameled also improves the adhesion properties of the ground coat. The ground coat must also have good workability, low viscosity and low surface tension.

In accordance with the claimed invention, in preparing a ground coat enamel composition it is not necessary to prepare and use a frit produced from raw materials. The overall process of the claimed invention proceeds as follows. Overspray material generated during the ground coat and cover coat enameling operations is collected in dust collection units. Since the ratio of ground coat to cover coat is random, the overspray material would typically be disposed of as land fill material. In order to eliminate disposal costs and consequences thereof, the process of the claimed invention recycles the collected material for use as ground coat material.

The dust collection unit is typically located within 10–20 feet of the spray booth. A dust collection unit suitable for collecting overspray material in accordance with the method of the present invention is manufactured by Torrit Industries Inc. The unit includes blowers which move air at a velocity of approximately 27,000 to 33,000 cubic feet per minute to collect overspray material from the spray booth.

Typically, but not always, ground coat and cover coat applications are accomplished in one shift. Ware to be coated with ground coat is placed on a spray line conveyor which travels through the spray booth. As the articles are sprayed with ground coat, any enamel spray material not reaching the articles is directed to the dust collection unit by the blowers. The sprayed articles are then transferred to the furnace and dried at about 180° to about 230° F. After drying, the articles are fired at a temperature between about 1450° to about 1650° F. The fired articles are transferred back to the spray line for application of the cover coat. As in the ground coat application, overspray material resulting from the cover coat application is simultaneously directed to the dust collection unit by the blowers and collected.

The overspray material from both ground and cover coat applications is collected in the same dust collection unit. After the unit reaches its maximum capacity, in this case typically after approximately five or six shifts, the overspray material is transferred to 100–200 gallon containers. Enriched powder is added to the overspray material in a ratio of approximately 60 to approximately 90 parts by volume of overspray material to approximately 10 to approximately 40 parts by volume of enriched powder.

The preferred ratio is 70 parts by volume of overspray material to 30 parts by volume of enriched powder. The overspray material and the enriched powder are preferably in dry powder form. The enriched powder typically contains the following oxides in the specified ranges as set forth in Table I:

TABLE I

| Oxide | Percent by Weight |
|---|---|
| $SiO_2$ | 24–36% |
| $Na_2O$ | 10–16% |
| $Al_2O$ | 1.5–3.5% |
| $K_2O$ | 1.0–4.0% |
| CaO | 6–14% |
| $TiO_2$ | 0.5–2.0% |
| MnO | 0.5–2.5% |
| $Fe_2O_3$ | 0.2–1.5% |
| CoO | 0.2–1.0% |
| $P_2O_5$ | 0.2–1.0% |
| NiO | 1.0–3.0% |
| CuO | 0.1–1.5% |
| ZnO | 1.0–3.5% |
| $B_2O_3$ | 10–21.0% |
| $Li_2O$ | 1.5–5.0% |
| MgO | 0–1.0% |

The enriched powder is typically formed from a mixture of borosilicate glass, clay and metal oxides. The materials are blended together, melted to a temperature between about 1800° to about 2300° F. and milled to a fine powder. Additional clay is added during milling as a suspending agent. The enriched powder is commercially available as RM-24 from Ferro Corporation in Cleveland, Ohio. The enriched powder provides good bond strength and proper refractoriness to the ground coat enamel.

After the overspray material and enriched powder are blended, water is then added in an amount of about 30 to about 50% by volume to the overspray-powder mixture. The resulting slurry is atomized in a 60 gallon pressure tank. The mixture is then blended with a high shear mixer for approximately 15 minutes. The resulting slurry is tested for specific gravity which should be in the range of about 1.70 to about 1.75 and slump which should be between about 5 to about 8 inches. The slurry is adjusted for specific gravity and slump by the addition of either more water or enriched powder. More water is added if the specific gravity is too high and more powder is added if the gravity is too low. If the slump is too high, a setting agent such as potassium nitrite or potassium carbonate may be added. The ratio of overspray material to enriched powder is based on the desired bonding properties required. The bonding properties of the mixture may be tested by measuring the impact resistance of the mixture as applied to a steel plate. If the bond strength is weak, more enriched powder is added.

The slurry is then applied as ground coat to the article to be enameled by spraying, dipping, flow coating or other conventional procedure. It is typically dried at about 180° to about 230° F. and subsequently fired at a temperature between about 1450° to about 1650° F.

The present invention will now be described further in detail by way of the following example. An enriched powder was produced containing the following composition as set forth in Table II.

TABLE II

| Oxide | Percent by Weight |
|---|---|
| $SiO_2$ | 30.8% |
| $Na_2O$ | 13.7% |
| $Al_2O_3$ | 2.27% |
| $K_2O$ | 2.93% |
| CaO | 10.3% |
| $P_2O_5$ | 0.43% |
| $TiO_2$ | 1.07% |
| MnO | 1.56% |
| $Fe_2O_3$ | 0.87% |
| CoO | 0.44% |
| NiO | 1.77% |
| CuO | 0.78% |
| ZnO | 2.12% |
| $B_2O_3$ | 16.9% |
| $Li_2O$ | 3.87% |
| MgO | 0.17% |

Enriched powder in the amount of 233 lbs. was added to 542.5 lbs. of overspray material. Water was added to the mixture in an amount of 51 gallons. The mixture was blended with a Hockemer high shear mixer for 15 minutes. The resulting slurry had a specific gravity of 1.72 and a slump of 6.5 inches. The slurry was sprayed onto a flat steel plate as ground coat at a thickness of approximately 6 mils, dried at 180° F., and fired at a temperature of 1560° F. Impact resistance tests were then conducted to determine the bonding properties of the fired ground coat.

Impact Resistance Test

The enamel coated steel plate was placed over a sharp-edged bottomless die. A four pound weight was dropped from a height of 20 inches onto the test specimen. The force at impact was approximately 80 in-lbs. The specimen was then checked for delamination. The evaluation for delamination is a visual observation dependent on the portion of metal and ground coat present as follows:

- metal present—no bond
- equal portions of metal and ground coat present—poor bond
- more ground coat than metal present—fair bond
- little or no metal present—good bond
- only ground coat present—excellent bond The enamel that was tested had good to excellent bond strength.

Although illustrative embodiments of the present invention have been described herein, it is to be understood that the invention is not limited to those precise embodiments, and that various other changes and modifications may be effected therein by one skilled in the art without departing from the scope or spirit of the invention.

What is claimed is:

1. A method for recycling overspray material, which includes ground coat and cover coat enamel materials oversprayed during the enameling of a first substrate, said method comprising:

collecting overspray material during said enameling process;

mixing a first amount of an enriched powder additive material with said overspray material to form a mixture of overspray material and enriched powder, said first amount being enough to achieve a desired bond strength for said mixture;

said enriched powder additive material comprising oxides formed from borosilicate glass, clay and metal oxides;

adding a first amount of water to said mixture to form a slurry;

optionally changing the rheology of said slurry; and applying said slurry as a ground coat to a second substrate.

2. The method of claim 1 wherein said enriched powder additive material and said overspray material are in dry form when mixed together.

3. The method of claim 2 wherein said enriched powder additive material is present in an amount of from about 10 to about 40 parts by volume of said mixture and said overspray material is present in an amount of from about 60 to about 90 parts by volume of said mixture.

4. The method of claim 3 wherein said enriched powder additive material is present in an amount of from about 20 to about 30 parts by volume of said mixture and said overspray material is present in an amount of from about 70 to about 80 parts by volume of said mixture.

5. The method of claim 4 wherein said enriched powder additive material is present in an amount of about 30 parts by volume of said mixture and said overspray material is present in an amount of about 70 parts by volume of said mixture.

6. The method of claim 3 wherein said water is added in an amount of from about 30 to about 50 parts by volume to said mixture to form said slurry.

7. The method of claim 1 wherein said slurry is applied to said second substrate by spraying.

8. The method of claim 1 further comprising drying said slurry on said second substrate and firing said slurry on said second substrate to form a ground coating thereon.

9. The method of claim 8 wherein said drying of said second substrate is conducted at a temperature between about 180° to about 230° F. and said firing is conducted at a temperature between about 1450° to about 1650° F.

10. The method of claim 1 wherein said overspray material is collected in dust collection units using blowers.

11. The method of claim 10 wherein said collected overspray material is transferred to a container of about 100 to about 200 gallon capacity after said dust collection units reach maximum capacity.

12. The method of claim 11 wherein said mixing of said overspray material with said enriched powder additive material is performed in said container.

13. The method of claim 1 wherein said enriched powder additive material comprises silica, sodium oxide, calcium oxide, boric oxide and trace amounts of metal oxides.

14. The method of claim 13 wherein said enriched powder additive material comprises the following components in weight percent: about 24 to about 36% $SiO_2$, about 10 to about 16% $Na_2O$, about 1.5 to about 3.5% $Al_2O_3$, about 0.2 about 1.0% $P_2O_5$, about 1.0 to about 4.0% $K_2O$, about 6 to about 14% CaO, about 0.5 to about 2.0% $TiO_2$, about 0.5 to about 2.5% MnO, about 0.2 to about 1.5% $Fe_2O_3$, about 0.2 to about 1.0% CoO, about 1.0 to about 3.0% NiO, about 0.1 to about 1.5% CuO, about 1.0 to about 3.5% ZnO, about 10 to about 21.0% $B_2O_3$, about 1.5 to about 5.0% $Li_2O$, and 0 to about 1.0% MgO.

15. The method of claim 1 wherein the step of optionally changing said rheology comprises measuring the specific gravity and the slump of said slurry.

16. The method of claim 15 wherein said specific gravity and said slump are adjusted by the addition of one of the components selected from the group consisting of a second amount of water and a second amount of enriched powder additive material.

17. The method of claim 15 further comprising adjusting said rheology by varying the specific gravity and the slump, wherein said specific gravity is adjusted to be in the range of about 1.70 to about 1.75 and said slump is adjusted to be in the range of about 5 to about 8 inches.

18. The method of claim 17 wherein said slump is adjusted by the addition of one of the components selected from the group consisting of potassium nitrite and potassium carbonate.

19. The method of claim 1 wherein said desired bond strength is equivalent to the bond strength of said ground coat enamel material.

20. The method of claim 1 wherein said first substrate comprises a first set of sanitary ware and said second substrate comprises a second set of sanitary ware.

21. The method of claim 20 wherein the sanitary ware is an article selected from the group consisting of sinks, tubs, water closets and urinals.

22. A product comprising overspray material in an amount of approximately 60 to 90 parts by volume and enriched powder additive material in an amount of approximately 10 to 40 parts by volume, said enriched powder additive material comprising oxides formed from borosilicate glass, clay and metal oxides.

23. The product of claim 22 wherein said overspray material comprises excess material from ground coat enameling and cover coat enameling.

24. The product of claim 23 comprising silica, sodium oxide, calcium oxide, boric oxide and trace amounts of metal oxides.

25. The product of claim 24 comprising the following components in weight percent: about 24 to about 36% $SiO_2$, about 10 to about 16% $Na_2O$, about 1.5 to about 3.5% $Al_2O_3$, about 0.2 to about 1.0% $P_2O_5$, about 1.0 about 4.0% $K_2O$, about 6 to about 14% CaO, about 0.5 to about 2.0% $TiO_2$, about 0.5 to about 2.5% MnO, about 0.2 to about 1.5% $Fe_2O_3$, about 0.2 to about 1.0% CoO, about 1.0 to about 3.0% NiO, about 0.1 to about 1.5% CuO, about 1.0 to about 3.5% ZnO, about 10 to about 21.0% $B_2O_3$, about 1.5 to about 5.0% $Li_2O_3$, and 0 to about 1.0% MgO.

26. A slurry comprising water combined with a mixture comprised of overspray material in an amount of approximately 60 to 90 parts by volume and enriched powder additive material in an amount of approximately 10 to 40 parts by volume, said enriched powder additive material comprising oxides formed from borosilicate glass, clay and metal oxides.

27. The slurry of claim 26 comprising overspray material in an amount of about 30 to about 63 parts by volume, enriched powder additive material in an amount of about 5 to about 28 parts by volume, and water in an amount of about 30 to about 50 parts by volume.

28. A second set of sanitary ware formed by the method comprising:

collecting overspray material during the enameling of a first set of sanitary ware wherein said enameling process includes ground coat and cover coat enameling materials and wherein said overspray material comprises ground coat and cover coat enamel material;

mixing an amount of an enriched powder additive material with said overspray material to form a mixture of overspray material and enriched powder, said enriched powder additive material being added in an amount sufficient to bolster the bond strength of said mixture;

said enriched powder additive material comprising oxides formed from borosilicate glass, clay and metal oxides;

adding an amount of water to said mixture to form a slurry;

optionally changing the rheology of said slurry;

applying said slurry to said second set of sanitary ware; and drying and firing said second set of sanitary ware to provide a ground coating thereon.

29. A method for recycling overspray material from the enameling of a first set of sanitary ware comprising:

collecting overspray material during said enameling process, said enameling process including ground coat and cover coat enameling and said overspray material comprising ground coat and cover coat enamel material, said ground coat material comprising refractory oxides selected from the group consisting of silica and alumina, fluxing agents from the group consisting of boron and fluorine, and adhesion oxides from the group consisting of cobalt and nickel oxide;

mixing an amount of an enriched powder additive material with said overspray material to form a mixture of overspray material and enriched powder, said enriched powder additive material comprising about 24 to about 36% $SiO_2$, about 10 to about 16% $Na_2O$, about 1.5 to about 3.5% $Al_2O_3$, about 0.2 to about 1.0% $P_2O_5$, about 1.0 to about 4.0% $K_2O$, about 6 to about 14% CaO, about 0.5 to about 2.0% $TiO_2$, about 0.5 to about 2.5% MnO, about 0.2 to about 1.5% $Fe_2O_3$, about 0.2 to about 1.0% CoO, about 1.0 to about 3.0% NiO, about 0.1 to about 1.5% CuO, about 1.0 to about 3.5% ZnO, about 10 to about 21.0% $B_2O_3$, about 1.5 to about 5.0% $Li_2O$, and 0 to about 1.0% MgO, said enriched powder additive material being added in an amount sufficient to restore bond strength and refractoriness of said mixture to about the equivalent bond strength and refractoriness of ground coat enamel;

adding an amount of water to said mixture to form a slurry;

optionally changing the rheology of said slurry; and applying said slurry as a ground coat to a second set of sanitary ware.

* * * * *